(12) United States Patent
Kwatra et al.

(10) Patent No.: US 11,290,414 B2
(45) Date of Patent: Mar. 29, 2022

(54) METHODS AND SYSTEMS FOR MANAGING COMMUNICATIONS AND RESPONSES THERETO

(71) Applicant: INTERNATIONAL BUSINESS MACHINES CORPORATION, Armonk, NY (US)

(72) Inventors: Shikhar Kwatra, Durham, NC (US); Sushain Pandit, Austin, TX (US); Paul Krystek, Highland, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 16/241,681

(22) Filed: Jan. 7, 2019

(65) Prior Publication Data
US 2020/0220835 A1 Jul. 9, 2020

(51) Int. Cl.
| | | |
|---|---|---|
| *H04L 51/56* | (2022.01) | |
| *H04L 51/234* | (2022.01) | |
| *H04L 51/02* | (2022.01) | |
| *G06N 20/00* | (2019.01) | |
| *H04L 67/30* | (2022.01) | |

(52) U.S. Cl.
CPC .............. *H04L 51/36* (2013.01); *H04L 51/02* (2013.01); *H04L 51/34* (2013.01); *G06N 20/00* (2019.01); *H04L 67/30* (2013.01)

(58) Field of Classification Search
CPC ..... G06F 16/3329; G06F 16/248; G06N 5/02; H04L 51/02
See application file for complete search history.

(56) References Cited

U.S. PATENT DOCUMENTS

| | | | |
|---|---|---|---|
| 6,938,068 B1 | 8/2005 | Kraft et al. | |
| 9,166,943 B2 | 10/2015 | Hamilton et al. | |
| 2006/0057079 A1 | 3/2006 | Pickover | |
| 2015/0180940 A1 | 6/2015 | Kozloski et al. | |
| 2016/0036689 A1* | 2/2016 | Avci | H04L 43/0894 370/235 |
| 2017/0075988 A1* | 3/2017 | Kadiri | G06F 16/3329 |
| 2017/0295121 A1* | 10/2017 | Zhang | H04L 51/02 |
| 2017/0364802 A1 | 12/2017 | Gordon et al. | |

(Continued)

OTHER PUBLICATIONS

Q. Du, "Explore Social Question and Answer System Based on Relationships in Social Network," 2013 Fourth International Conference on Emerging Intelligent Data and Web Technologies, Xi'an, 2013, pp. 490-495.

(Continued)

*Primary Examiner* — William G Trost, IV
*Assistant Examiner* — Christopher P Cadorna
(74) *Attorney, Agent, or Firm* — Griffiths & Seaton PLLC

(57) ABSTRACT

Embodiments for managing communications by one or more processors are described. Communication content is received from an individual. At least one communication channel to which to send the communication content is selected. The at least one communication channel is selected from a plurality of communication channels based on the communication content and at least one data source associated with the plurality of communication channels. A notification of the at least one selected communication channel is generated.

12 Claims, 5 Drawing Sheets

(56) References Cited

U.S. PATENT DOCUMENTS

| | | | | |
|---|---|---|---|---|
| 2018/0276553 A1* | 9/2018 | Redkar | .................. | G06N 5/022 |
| 2018/0337967 A1* | 11/2018 | Ritchie | ............... | H04L 65/4007 |
| 2019/0102781 A1* | 4/2019 | Myer | ...................... | H04L 51/26 |
| 2020/0151274 A1* | 5/2020 | Tran | ........................ | G06F 9/547 |
| 2020/0220835 A1* | 7/2020 | Kwatra | .................. | H04L 67/10 |

OTHER PUBLICATIONS

H. Fang, "Community-Based Question Answering via Heterogeneous Social Network Learning." Proceedings of the Thirtieth AAAI Conference on Artificial Intelligence (AAAI-16), 2016, pp. 122-128.

P. Molino, 2016. "Social Question Answering: Textual, User, and Network Features for Best Answer Prediction." ACM Trans. Inf. Syst. 35, 1, Article 4 (Sep. 2016), pp. 4:1-4:40.

H. Shen, "SocialQ&A: An Online Social Network Based Question and Answer System," in IEEE Transactions on Big Data, vol. 3, No. 1, pp. 91-106, Mar. 1, 2017.

* cited by examiner

METHODS AND SYSTEMS FOR MANAGING COMMUNICATIONS AND RESPONSES THERETO

BACKGROUND OF THE INVENTION

Field of the Invention

The present invention relates in general to computing systems, and more particularly, to various embodiments for managing communications and responses to communications, such as when an answer to a query is sought.

Description of the Related Art

Modern (e.g., online or electronic) communication systems provide users with various ways for finding answers to questions. As one example, users may send their contacts (e.g., friends, family, business associates, etc.) questions in various ways, such as text messaging, email, messaging applications, social media platforms, and phone calls. Also, users may now make use of cognitive question answering systems, such as chatbots, also known as talkbots, chatterbots, bots, instant messaging (IM) bots, interactive agents, Artificial Conversational Entities (ACEs), etc, or other cognitive question answering systems. Chatbots (and/or other cognitive question answering systems) are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions, and the chatbot answers (or responds) based on its knowledge base and/or by analyzing the question, providing the best answer it can generate.

However, in some instances using these methods, users are not able to find the answers they desire, at least not as quickly as they would like. For example, when sending the question to a contact, the user may not receive a response within they consider to be an appropriate time frame. While when using cognitive question answering systems, the user may not be able to effectively describe the problem, and the system may not be able to provide the answer needed because of lack of understanding of the problem and/or lack of information provided by the user.

SUMMARY OF THE INVENTION

Various embodiments for managing communications by one or more processors are described. In one embodiment, by way of example only, a method for managing electronic communications, again by one or more processors, is provided. Communication content is received from an individual. At least one communication channel to which to send the communication content is selected. The at least one communication channel is selected from a plurality of communication channels based on the communication content and at least one data source associated with the plurality of communication channels. A notification of the at least one selected communication channel is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
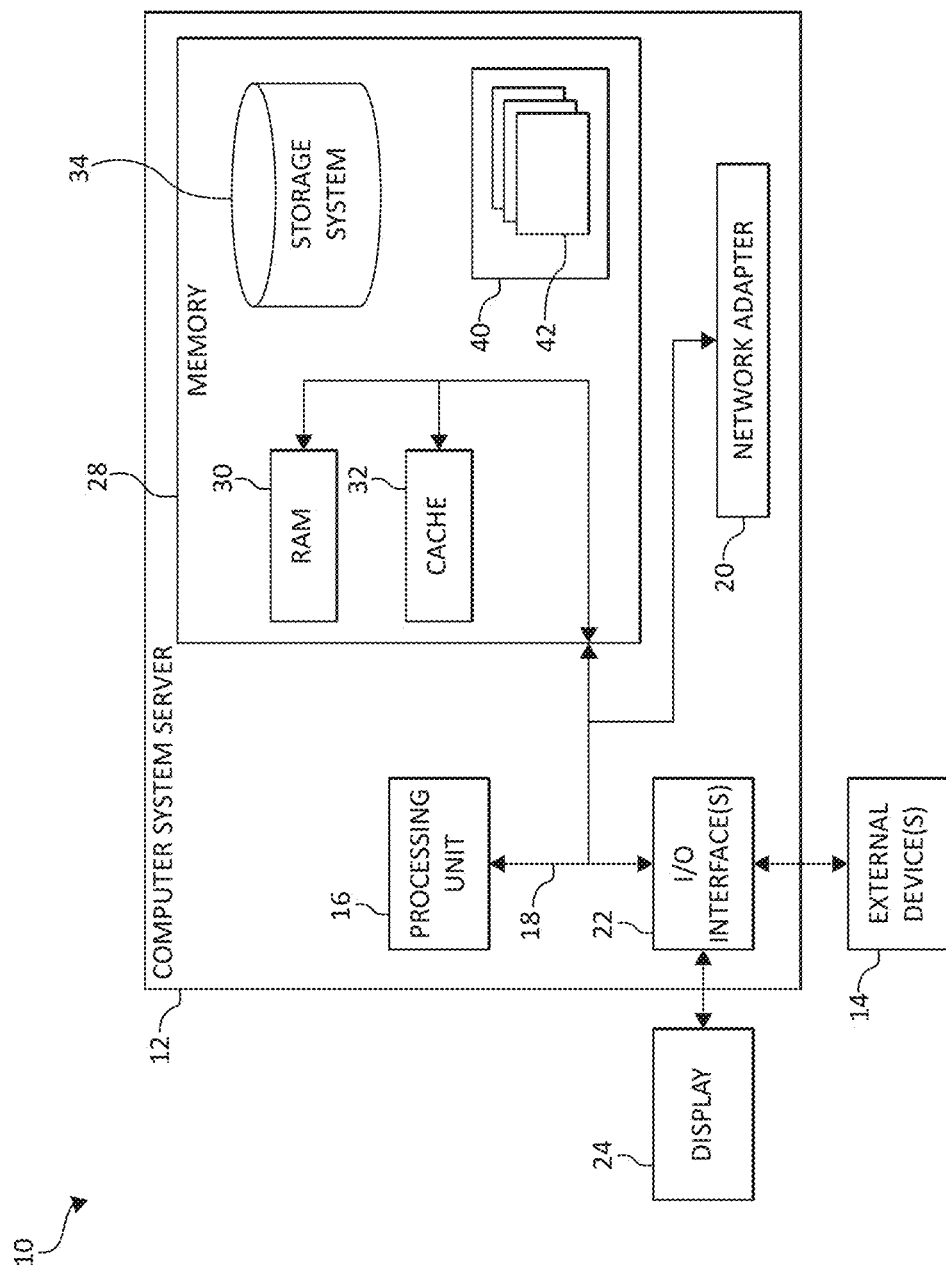
FIG. 1 is a block diagram depicting an exemplary computing node according to an embodiment of the present invention.

As discussed above, modern (e.g., online or electronic) communication systems provide users with various ways for finding answers to questions. As one example, users may send their contacts (e.g., friends, family, business associates, etc.) questions in various ways, such as text messaging, email, messaging applications, social media platforms, and phone calls. Also, users may now make use of cognitive question answering systems, such as chatbots, also known as talkbots, chatterbots, bots, instant messaging (IM) bots, interactive agents, Artificial Conversational Entities (ACEs), etc, or other cognitive question answering systems. Chatbots (and/or other cognitive question answering systems) are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions, and the chatbot answers (or responds) based on its knowledge base and/or by analyzing the question, providing the best answer it can generate.

However, in some instances using these methods, users are not able to find the answers they desire, at least not as quickly as they would like. For example, when sending the question to a contact, the user may not receive a response within they consider to be an appropriate time frame. While when using cognitive question answering systems, the user may not be able to effectively describe the problem, and the system may not be able to provide the answer needed because of lack of understanding of the problem and/or lack of information provided by the user.

Thus, what is needed are methods and systems that, for example, integrate cognitive question answering systems with the expertise of the users' contacts to provide an optimal, or at least improved, manner for finding or obtaining answers to queries (or questions). Although the description provided herein may repeatedly refer to the communications sent by the user(s) as being queries (or questions or interrogatives), it should be understood that the embodiments described herein may also be applied to other types of communications, such as statements/declaratives, exclamations, and command/requests/imperatives which may be considered to be associated with queries (e.g., a statement indicating that the user has not completed their tax return may be considered to be associated with a query regarding the tax return, such as filing deadline).

To address these needs, some embodiments described herein provide methods and systems for managing communications (e.g., electronic communications) in which, for example, the content of a communication (e.g., a query) is analyzed along with data sources associated with available communication channels. Based on the analysis, one (or more) of the communication channels is selected, and in some embodiments, a notification of the selected channel(s) is generated (e.g., an indication thereof is provided to the user).

The communication content may then be sent to one (or more) of the selected communication channels. Each of the communication channels may be associated with another user (or group of other users) besides the user that generates (or composes) the communication content. More particularly, each of the communication channels may be associated with a particular manner of sending a communication (e.g., an online communication, electronic communication, etc.) to (and/or receiving communications from and/or communicating with) another user (e.g., sending a communication to/receiving a response from the other user(s) via text messaging, email, social media platform, etc.). However, it should also be understood that the communication channels may be associated with non-human, automated cognitive question answering services or systems (e.g., chatbots). That is, in some embodiments, a communication channel may also refer to a particular manner for communicating with an automated cognitive question answering service.

In some embodiments, the data sources associated with the communication channels may include, for example, previous communications (and/or the content thereof) sent to and/or received from the communication channels (and/or the respective users) and profiles (e.g., cognitive profiles) of the users associated with the communication channels. In some embodiments, the analysis of the data sources (and/or the management of communications described herein) may include a cognitive analysis (and/or include generating a cognitive profile of the users/communication channels).

The cognitive profile for the user(s) (and/or communication channels) may be based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, computing systems/devices/nodes associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, education, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may also include classifying natural language, analyzing tone, and analyzing sentiment (e.g., scanning for keywords, key phrases, etc.) with respect to, for example, communications (and/or the content thereof) sent to and/or received/detected by a cognitive question answering system (or chatbot). In some embodiments, natural language processing (NLP), Mel-frequency cepstral coefficients (MFCCs), and/or region-based convolutional neural network (R-CNN) pixel mapping (e.g., for images/videos sent to chatbots), as are commonly understood, are used. Over time, the methods and systems described herein may determine correlations (or insights) between communications (e.g., voice and/or text-based communications) received and data sources associated with the communications, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of communications as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices that are owned and/or otherwise associated with individuals (or users), and/or various applications that are utilized by the individuals on such computing devices.

In particular, in some embodiments, a method for managing communications by one or more processors is described. Communication content is received from an individual. At least one communication channel to which to send the communication content is selected. The at least one communication channel is selected from a plurality of communication channels based on the communication content and at least one data source associated with the plurality of communication channels. A notification of the at least one selected communication channel is generated.

The selecting of the at least one communication channel may be performed utilizing a cognitive analysis of the at least one data source associated with the plurality of communication channels. The communication content may include a query.

Each of the plurality of communication channels may be associated with another individual or a group of other individuals. The at least one data source associated with the plurality of communication channels may includes at least one of previous communications sent between the individual and each of the plurality of communication channels, a profile associated with each of the plurality of communication channels, and a status associated with each of the plurality of communication channels.

The notification of the at least one selected communication channel may be provided to the individual. An expected response time may be calculated for each of the at least one selected communication channel. The notification may include the expected response time for each of the at least one selected communication channel.

Each of the plurality of communication channels may utilize (and/or be associated with) at least one of text messaging, email, a messaging application, and a social media platform.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
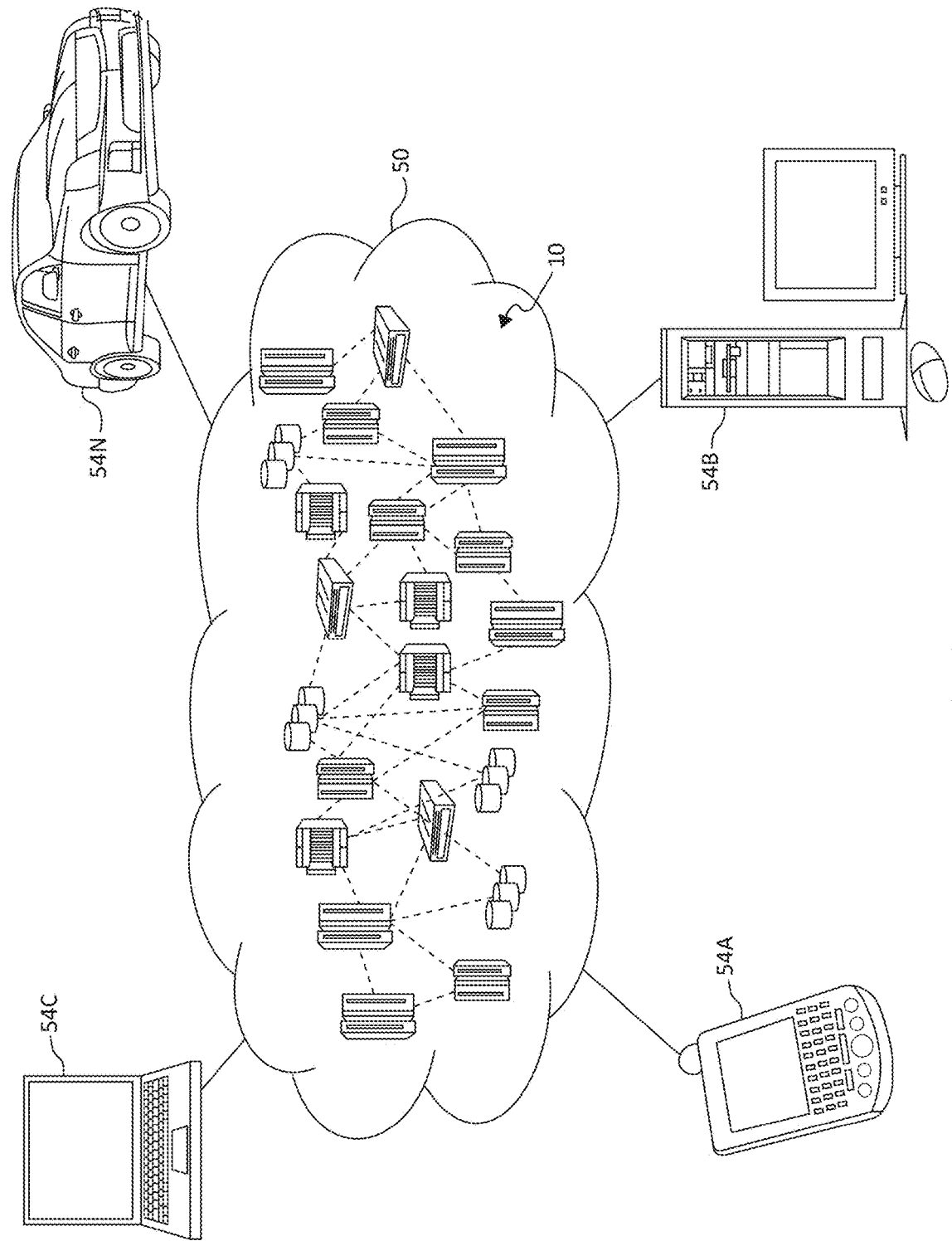
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
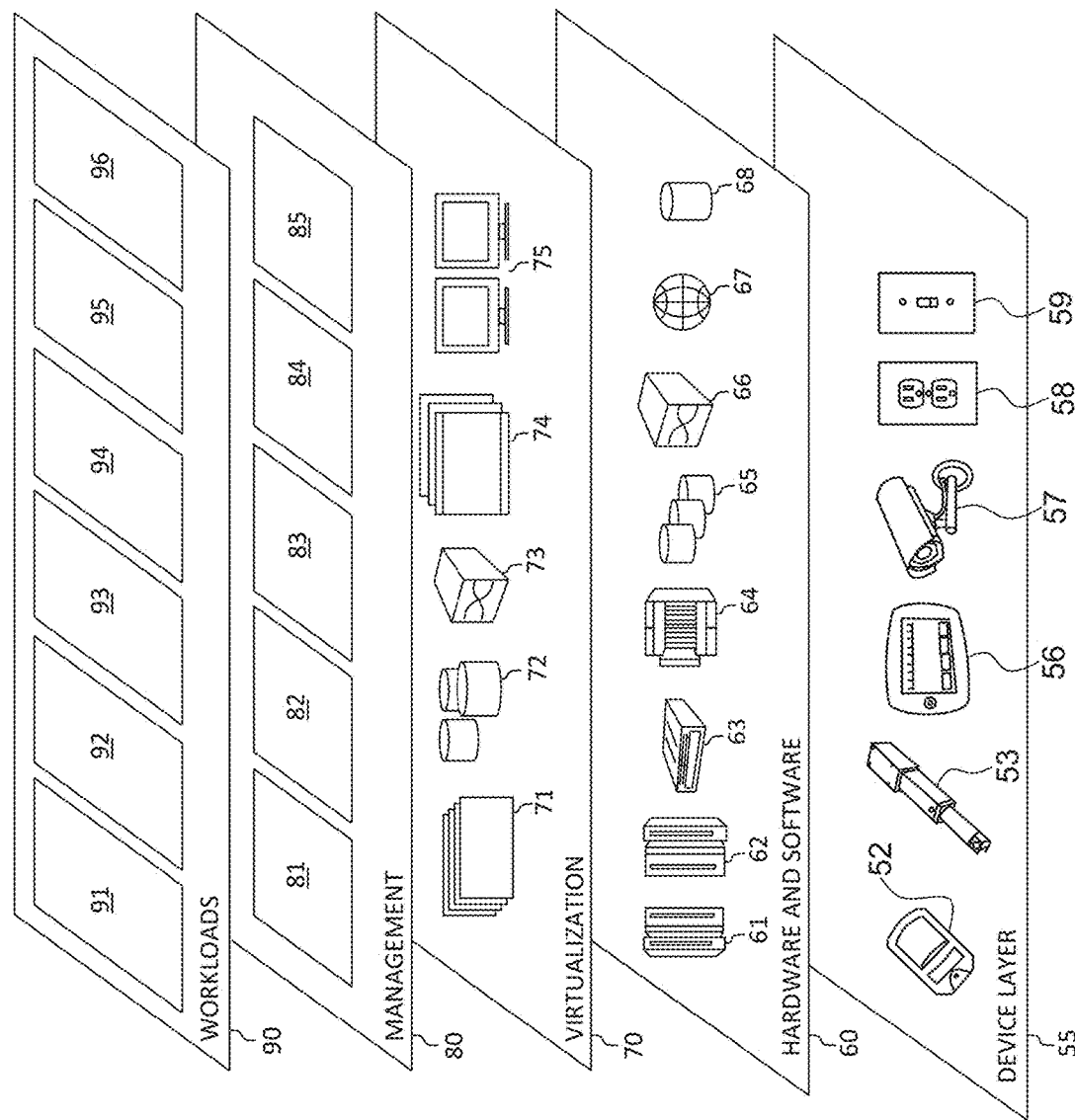
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing communications as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that manage communications (e.g., electronic communications). In some embodiments, the content of a communication (e.g., a query) is analyzed along with data sources associated with available communication channels. Based on the analysis, one (or more) of the communication channels is selected, and a notification (or indication) of the selected channel(s) is generated (e.g., a notification/indication thereof is provided to the user).

In some embodiments, a list of subjects, topics, etc., along with one or more of a user's contacts (e.g., friends, family, business associates, etc.) and/or communication channels, associated with each subject/topic, is established or generated. The list may be manually generated by the user and/or generated by the system based on, for example, cognitive profiles of the contacts. Scores (or grades) and/or confidence thresholds for each of the contacts with respect to the subjects may be generated and/or updated (e.g., manually or automatically by the system) based on, for example, the time taken by the contacts to respond to (previous) communications (e.g., queries) and/or feedback provided by the user (e.g., regarding the accuracy of the answer, the usefulness of the answer, etc.). The list (along with the scores/grades, etc.) may be stored in a database (e.g., on the cloud). In some embodiments, contacts (and/or communication channels) may include and/or be associated with non-human, automated cognitive question answering services (e.g., chatbots).

In some embodiments, when a user sends a communication, such as a query, to the cognitive question answering system (or more simply, "the system"), such as by via a text-based method (e.g., using a keyboard) or via voice/speech (e.g., using a microphone on a computing device), the communication or the content thereof (i.e., "sent" or "to be sent" content) is analyzed. NLP or a MFCC algorithm may be used. The analysis may provide the system with an understanding of the content (e.g., the query) and facilitate the system in determining confidence factors with respect to responses and/or the communication channels, or more particularly, the users/other individuals associated with the communication channels.

For example, in some embodiments, the user may compose a text-based message in a text box or window of a social media platform (or application), which is to be sent to a particular recipient or contact (or friend) of the user (e.g., another user of the social media platform who is associated with the user as a contact, friend, etc.). In some embodiments, the methods described herein are initiated when such a communication is composed (i.e., before it is sent/transmitted to/through the communication channel). However, in some embodiments, the methods described herein are initiated after the communication is sent or transmitted.

After the communication (or message) is composed (e.g., before or after being transmitted), the content of the communication is analyzed as described above. As such, the system may determine, for example, that the user is asking the recipient a question. Additionally, the system may calculate a predicted response time based on, for example, previous messages sent to/responses received from the recipient, a "status" of the recipient (e.g., whether or not the recipient is "logged on," a particular status set by the recipient, etc.), and the expertise of the recipient (e.g., based on the cognitive profile of the recipient).

In some embodiments, if the predicted response time is over a predetermined threshold (e.g., set by the user) or perhaps regardless of the predicted response time, the system may calculate predicted response times for other contacts (or potential recipients) associated with the user (e.g., all other contacts of the user or contacts selected based on expertise of the contacts with respect to the communication content). In some embodiments, the potential recipients (or other communication channels) may include those associated with the user through other communication systems (e.g., besides a social media platform), such as through email, text messaging, phone calls, etc.

The predicted response times for the other contacts may be calculated or determined in the same manner (e.g., based on previous messages/responses, status, expertise, cognitive profile, etc.). In some embodiments, a multi-level neural network classifier is used to analyze the available data to determine the predicted response times.

In some embodiments, the system selects at least some of the other contacts as potential recipients (e.g., those with predicted response times below a predetermined threshold and/or below the predicted response time for the initial recipient, etc.). A notification of the potential recipients may be provided to the user (e.g., as a list including predicted response times), who may then manually select one or more of the potential recipients to which to send the communication and/or manually initiate a communication session with one or more of the potential recipients in the appropriate manner (e.g., text messaging, email, etc.). As such, the user may be able to choose from the potential recipients in order to get a response to their communication (e.g., an answer to their question) more quickly. Alternatively, the communication may be automatically sent to at least some of the potential recipients (e.g., in the appropriate manner/mode of communication).

In some embodiments, if the system determines that the confidence factor with respect to contacting the initial recipient regarding a particular topic/subject is below a predetermined threshold (e.g., regarding predicted response time and/or expertise level), the system automatically sends the communication to a contact (or communication channel) with a confidence factor is that above the threshold (if possible). If the system determines that the confidence factor is above the threshold, the system may not automatically send the communication as such (but it may be manually requested by the user).

In some embodiments, the user is able to indicate which responses are acceptable and/or unacceptable. The system may utilize such feedback to adjust the confidence factors and/or rankings with respect to contacts response times and/or expertise. For example, if the user manually asks a particular contact about a topic despite the fact that the system has determined a relatively low confidence factor for that contact regarding the topic at hand, and the user then accepts the contact's response, such may be used to increase the confidence factor/ranking of that contact. Also, if a user has indicated that they have a strongly preferential view of the expertise of particular contacts (e.g., members of a social media group) with respect to some topics, then the system may assign relatively high confidence factor to those topics for the user. The confidence factor may then change based on the system's responses within that topic area and how often the user accepts those answers.

In some embodiments, when the communication is sent to multiple contacts (e.g., manually or automatically), and one or more responses (or answers) is received, the user may indicate that an acceptable response has been received (if that is the case). In such an instance, in some embodiments, the system may delete the communications that were sent to contact that have not yet responded. Alternatively, the system may wait for and receive all of the responses, which may then be used for contact rankings (e.g., with respect to response time and/or expertise level) and/or to improve the performance of the system.

In some embodiments, if the system detects common preferences across multiple users, a common user profile may be derived, which may be utilized to assign default confidence thresholds (and/or rankings) for other (e.g., future) users (e.g., via "crowdsourcing"). For example, if multiple users within a particular age group have a highly preferential view of contacts with their "social circles" (e.g., teenagers utilizing the same social media platform), the system may define a profile (e.g., "teenager") in which confidence rankings for particular topics/subjects are defaulted to a relatively high level (i.e., the system would default to utilizing the user's social media contacts of similar age). Such a setting may be overridden by manually adjusting thresholds/rankings, as described above.

In some embodiments, contacts with expertise in a particular subject may be ranked in an order of priority and/or preference such that those ranked relatively high receive the communication (e.g., query) first. If the responses received are not accepted by the user (and/or are not received within a predetermined amount of time), the system may then send the communication to lower ranked contacts. As mentioned above, such rankings may also be based, at least in part, on the time it takes for contacts to respond and/or whether or not a response is ever received from the contacts, as well as the accuracy or acceptance of their responses.

Figure 4:
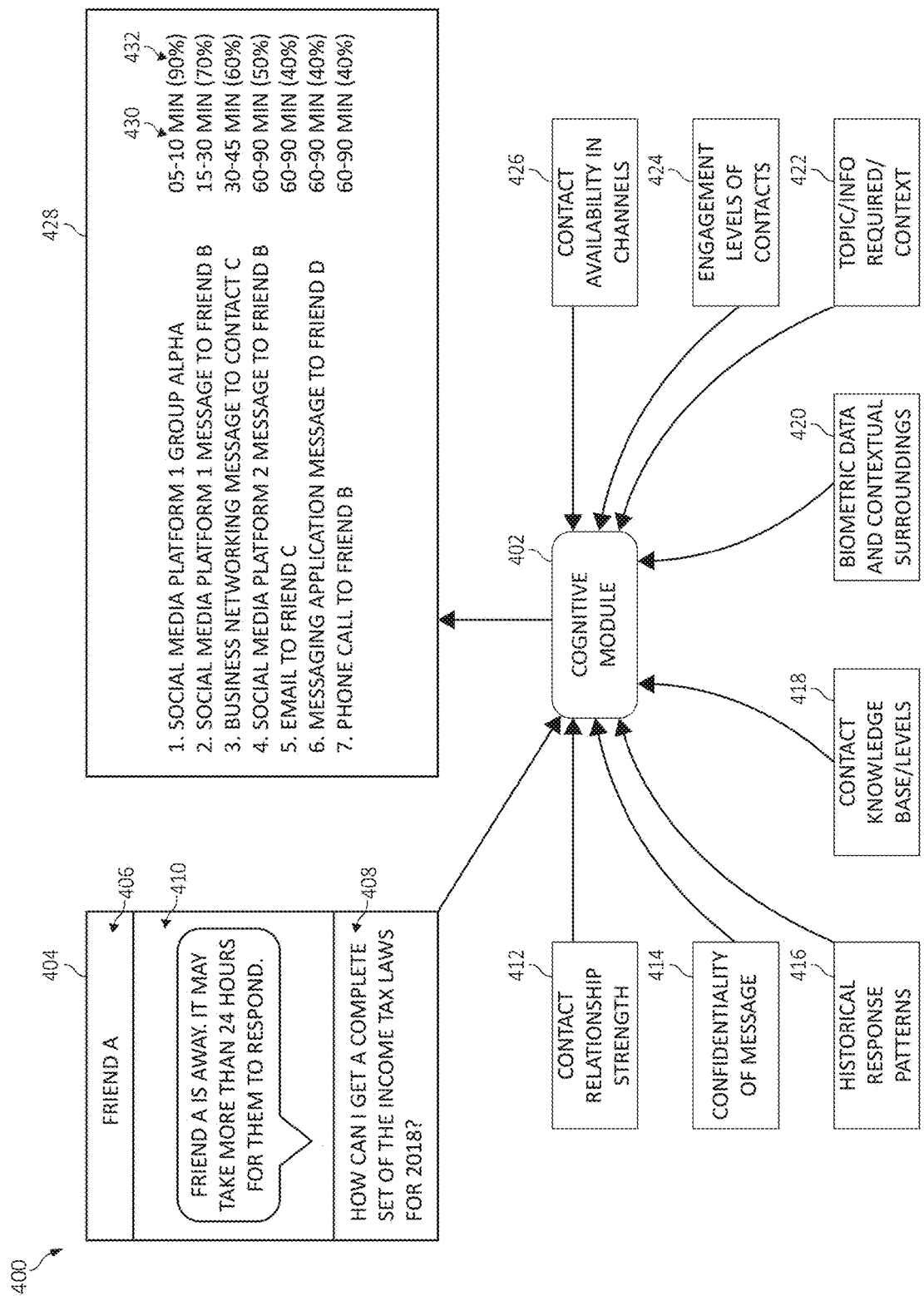
FIG. 4 is a simplified block diagram/flow chart of a method and/or system for managing communications according to an embodiment of the present invention.

FIG. 4 illustrates a system (and/or method) 400 for managing communications according to some embodiments described herein. The system 400 includes a cognitive module 402 that may include and/or be implemented utilizing any suitable computing system/device/node, such as those described above, which is configured to perform at least some of the aspects of functionality described herein. In some embodiments, the cognitive module 402 detects and/or receives a communication (or communication content) that is being/has been composed by a user or has been sent by the user to a particular communication channel (and/or a recipient associated therewith).

In the depicted embodiment, the user has composed a text-based communication in a text window 404. The text window 404 may be rendered on, and interacted with via, any suitable computing node (e.g., a mobile device, desktop PC, etc. and/or an application installed thereon). The text window 404 includes an identification panel 406, an entry panel 408, and a response panel 410. The identification panel 406 may be utilized to display the identification of the particular recipient with whom the user is communicating via the text window 404. In the depicted embodiment, the recipient is listed as "Friend A." The entry panel 408 may be utilized by the user to compose and/or enter communications (or communication content, messages, etc.), such as via a keyboard or voice commands, that are to be sent to the recipient. In the depicted embodiment, the user has entered communication content (or a message) that includes a query (or question) related to income tax laws. The response panel 410 may be utilized to display responses received from the recipient and/or an automated system (e.g., the cognitive module 402). In the depicted embodiment, a response has been received which indicates that the recipient is away/not available and that it may take more than 24 hours for them to respond (e.g., generated/sent by an automated response system). It should be understood that the response shown in FIG. 4 may be received after the message has been sent by the user to the recipient or while the user is composing the message in the entry panel 408 (i.e., before the message has been sent).

As described above, in some embodiments, the communication content (i.e., the message in composed in the entry panel 408 and/or sent to the recipient) is detected or received by the cognitive module 402. The cognitive module 402 also receives, is in operable communication with, and/or utilizes various data sources 412-426 associated with the user and/or the user's contacts and/or aspects of an analysis performed on the communication content (e.g., performed by the cognitive module 402). In the depicted embodiment, the data sources include contact relationship strength 412, the confidentiality of the message 414, historical response patterns 416, knowledge base/level of the contacts 418, biometric data/contextual surroundings 420, topic/information required/context of the message 422, engagement levels of the contacts 424, and the availability of the contacts 426. At least some of the data associated with data sources 412-426 that is related to the contacts of the user may be stored in any suitable database (e.g., on the cloud).

Contact relationship strength 412 may refer to length/duration of the relationships with the contacts (i.e., how long the user has known them), communication frequency (i.e., how often they communicate with them), the nature of the relationship (i.e., how the user knows the contact), etc. The confidentiality of the message 414 may refer to the extent to which the content of the message may be considered to be of a personal or sensitive nature, which may be determined using language processing techniques (such as those described above). For example, if the message is determined to be related to a health or family issue, the confidentiality of the message may be considered to be relatively high. However, if the message is determined to be related to a business or technical issue, the confidentiality of the message may be considered to be relatively low. The historical response patterns 416 may refer to delay between messages being sent to contacts and a response being received from the contacts (and/or how often the responses are accepted/not accepted by the user and/or feedback received from the user regarding the responses). The knowledge base/level of the contacts 418 may refer to the area(s), topic(s), subject(s) of expertise of the contacts as well as an indication of how knowledgeable the contacts are in those area(s) (e.g., as indicated in a cognitive profile of the contact). The biometric data/contextual surroundings 420 may refer to data indicative of the current state of the user (i.e., at the time the message is composed/sent), such as detected by biometric sensors (e.g., on wearable devices), facial/emotion recognition (e.g., via cameras), GPS (i.e., regarding location), etc. The topic/information required/context of the message 422 may refer to subject matter of the message (e.g., the question being asked and/or the information required), as well as perhaps the tone and/or sentiment of the language used in the message. The engagement levels of the contacts 424 may refer to the current activity of the contacts (e.g., in a business meeting, on vacation/traveling, etc.). The availability of the contacts 426 may refer to current status of the contact regarding different communication channels (e.g., latest activity, whether or not they are currently logged on, etc.).

Still referring to FIG. 4, the cognitive module 402 generates a list 428 of (secondary) communication channels (or potential recipients) based on, for example, the content of the message composed (or sent) by the user via the text window 404 and the data sources 412-426, as described above. In the example shown, the list 428 includes seven communication channels, each of which is associated with sending the message to a particular contact via a particular mode of communication (e.g., posting the message in a particular group in a social media platform, sending the message to a particular user via a messaging extension on the social media platform, sending the message through a messaging extension on a business networking platform, emailing a particular contact, placing a phone call, etc.).

It should be noted that at least some of the communication channels in the list are associated with contacts (i.e., Friend B, Contact C, Friend D, etc.) different than that one to which the message was originally intended to be sent (or already sent) (i.e., Friend A). As described above, in some embodiments, at least some of the communication channels may be associated with automated question answering services (e.g., chatbots).

In the example shown, predicted response times 430 and confidence rankings 432 have been calculated or determined for each of the communication channels and displayed on the list. As described above, the confidence rankings 432 may refer to the determined likelihood that the respective recipient will respond within the predicted response time and/or the likelihood that the response provided thereby will be acceptable to the user (e.g., the response will appropriately answer the user's question).

The list 428 may be rendered or displayed on the user's computing device, and the user may then manually select (e.g., via a keyboard, cursor, mouse, etc.) one or more of the communication channels on the list. The message may then be sent to those communication channels (and/or contacts). In some embodiments, the message is automatically sent to at least some of the communication channels on the list 428, as described above.

Figure 5:
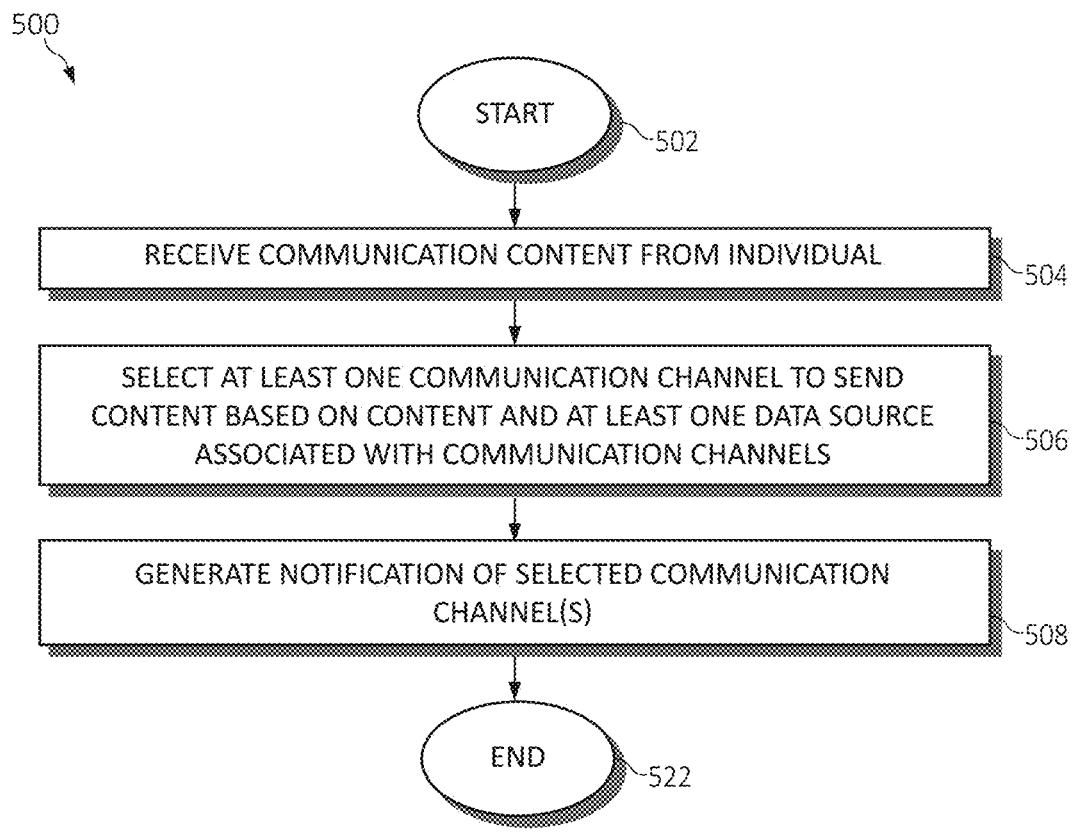
FIG. 5 is a flowchart diagram of an exemplary method for managing communications according to an embodiment of the present invention.

Turning to FIG. 5, a flowchart diagram of an exemplary method 500 for managing communications, in accordance with various aspects of the present invention, is provided. Method 500 begins (step 502) with, for example, a list of contacts (e.g., other users, individuals, etc. and/or non-human, automated cognitive question answering systems) for a user being established, with areas or topics of expertise being associated with each. The list may be created, managed, or adjusted manually by the user and/or automatically by the systems described herein (e.g., based on previous communications with the other users and/or cognitive profiles of the other users).

Communication content is received from an individual (step 504). The communication content may be received when, for example, the individual (or user) composes a communication (e.g., an electronic communication) and/or sends a communication. For example, the individual may compose and/or send the communication in a text window of a suitable computing node (e.g., text messaging, email, social media platform, etc.). The communication content (and/or the communication) may include a query (or question).

At least one communication channel to which to send the communication content is selected (step 506). The at least one communication channel is selected from a plurality of communication channels based on the communication content and at least one data source associated with the plurality of communication channels. Each of the plurality of communication channels may be associated with another individual, a group of other individuals, or an automated cognitive question answering service/system. Each of the plurality of communication channels may utilize (and/or be associated with) at least one of text messaging, email, a messaging application, and a social media platform. That is, each of the communication channels may be associated with a particular mode of communicating with another individual or group of individuals (or automated cognitive question answering service).

The at least one data source associated with the plurality of communication channels may include, for example, at least one of previous communications sent between the individual and each of the plurality of communication channels, a profile (e.g., a cognitive profile, knowledge base, etc.) associated with each of the plurality of communication channels, and a status associated with each of the plurality of communication channels. The selecting of the at least one communication channel may be performed utilizing a cognitive analysis of the at least one data source associated with the plurality of communication channels. An expected response time may be calculated for each of the at least one selected communication channel.

A notification of the at least one selected communication channel is generated (step 508). The notification (e.g., a list) of the at least one selected communication channel may be provided to the individual. For example, the notification may be displayed on (or rendered by or caused to be rendered by) a computing device (or a display screen thereof) associated with the individual and/or sent to the individual as an electronic message, such as an email, text message, etc. The notification may include the expected response time for each of the at least one selected communication channel.

Method 500 ends (step 510) with, for example, the communication (or the communication content) being sent to at least one of the selected communication channels. For example, the user may manually cause the communication to be sent to one or more of the selected communication channels, or the system may automatically send the communication to one or more of the communication channels. The process may be repeated when subsequent communication content is received. In some embodiments, the user(s) may provide feedback related to the management of the communications, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing communications comprising:
    receiving communication content from an individual;
    responsive to detecting that the communication content contains a query according to a cognitive analysis of the communication content, identifying at least another individual, associated with a respective communication channel of a plurality of communication channels, having knowledge of a subject of the query as compared to a group of individuals respectively associated with each other communication channel of the plurality of communication channels based on an analysis of previous responses of the entity to previous communications between the another individual and the individual;
    responsive to receiving the communication content, predicting, according to information from at least one data source associated with the plurality of communication channels, an expected response time for each of the plurality of communication channels prior to sending the communication content;
    selecting at least one communication channel of the plurality of communication channels to which to send the communication content based on the communication content, the knowledge of the subject by the another individual, and the expected response time, wherein the at least one communication channel is selected from those of the plurality of communication channels having the expected response time below a predetermined threshold; and
    generating a notification of the at least one selected communication channel, wherein the notification includes the expected response time for each of the at least one selected communication channel.

2. The method of claim 1, wherein each of the plurality of communication channels is associated with the another individual or the group of other individuals, and wherein the at least one data source associated with the plurality of communication channels includes at least one of the previous communications sent between the individual and each of the plurality of communication channels, a profile associated with each of the plurality of communication channels, and a status associated with each of the plurality of communication channels.

3. The method of claim 1, further comprising providing the notification of the at least one selected communication channel to the individual.

4. The method of claim 1, wherein each of the plurality of communication channels utilizes at least one of text messaging, email, a messaging application, and a social media platform.

5. A system for managing communications comprising:
    at least one processor that
        receives communication content from an individual;
        responsive to detecting that the communication content contains a query according to a cognitive analysis of the communication content, identifies at least another individual, associated with a respective communication channel of a plurality of communication channels, having knowledge of a subject of the query as compared to a group of individuals respectively associated with each other communication channel of the plurality of communication channels based on an analysis of previous responses of the entity to previous communications between the another individual and the individual;
        responsive to receiving the communication content, predicts, according to information from at least one data source associated with the plurality of communication channels, an expected response time for each of the plurality of communication channels prior to sending the communication content;
        selects at least one communication channel of the plurality of communication channels to which to send the communication content based on the communication content, the knowledge of the subject by the another individual, and the expected response time, wherein the at least one communication channel is selected from those of the plurality of communication channels having the expected response time below a predetermined threshold; and
        generates a notification of the at least one selected communication channel, wherein the notification includes the expected response time for each of the at least one selected communication channel.

6. The system of claim 5, wherein each of the plurality of communication channels is associated with the another individual or the group of other individuals, and wherein the at least one data source associated with the plurality of communication channels includes at least one of the previous communications sent between the individual and each of the plurality of communication channels, a profile associated with each of the plurality of communication channels, and a status associated with each of the plurality of communication channels.

7. The system of claim 5, wherein the at least one processor further provides the notification of the at least one selected communication channel to the individual.

8. The system of claim 5, wherein each of the plurality of communication channels utilizes at least one of text messaging, email, a messaging application, and a social media platform.

9. A computer program product for managing communications by one or more processors, the computer program product comprising a non-transitory computer-readable storage medium having computer-readable program code portions stored therein, the computer-readable program code portions comprising:

a first executable portion that receives communication content from an individual;

a second executable portion that, responsive to detecting that the communication content contains a query according to a cognitive analysis of the communication content, identifies at least another individual, associated with a respective communication channel of a plurality of communication channels, having knowledge of a subject of the query as compared to a group of individuals respectively associated with each other communication channel of the plurality of communication channels based on an analysis of previous responses of the entity to previous communications between the another individual and the individual;

a third executable portion that, responsive to receiving the communication content, predicting, according to information from at least one data source associated with the plurality of communication channels, an expected response time for each of the plurality of communication channels prior to sending the communication content;

a fourth executable portion that selects at least one communication channel of the plurality of communication channels to which to send the communication content based on the communication content, the knowledge of the subject by the another individual, and the expected response time, wherein the at least one communication channel is selected from those of the plurality of communication channels having the expected response time below a predetermined threshold; and a fifth executable portion that generates a notification of the at least one selected communication channel, wherein the notification includes the expected response time for each of the at least one selected communication channel.

10. The computer program product of claim 9, wherein each of the plurality of communication channels is associated with the another individual or the group of other individuals, and wherein the at least one data source associated with the plurality of communication channels includes at least one of the previous communications sent between the individual and each of the plurality of communication channels, a profile associated with each of the plurality of communication channels, and a status associated with each of the plurality of communication channels.

11. The computer program product of claim 9, wherein the computer-readable program code portions further include a sixth executable portion that provides the notification of the at least one selected communication channel to the individual.

12. The computer program product of claim 9, wherein each of the plurality of communication channels utilizes at least one of text messaging, email, a messaging application, and a social media platform.

* * * * *